Figure 1:
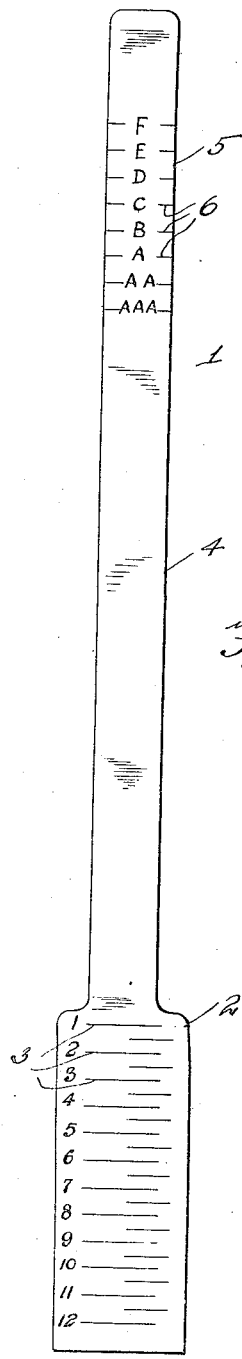

G. CLAUSING.
FOOT TAPE FOR MEASURING SHOES.
APPLICATION FILED FEB. 24, 1921.

1,431,873.  
Patented Oct. 10, 1922.

Inventor  
George Clausing  
By C. C. Shepherd  
Attorney

Patented Oct. 10, 1922.

1,431,873

UNITED STATES PATENT OFFICE.

GEORGE CLAUSING, OF DELAWARE, OHIO.

FOOT TAPE FOR MEASURING SHOES.

Application filed February 24, 1921. Serial No. 447,601.

*To all whom it may concern:*

Be it known that GEORGE CLAUSING, a citizen of the United States, residing at Delaware, in the county of Delaware and State of Ohio, has invented certain new and useful Improvements in Foot Tape for Measuring Shoes, of which the following is a specification.

This invention relates to an improved measuring tape capable of being employed in retail shoe establishments for the purpose of enabling a clerk to quickly and properly determine the correct shoe size of a customer and to thereby expedite the process of selecting shoes of proper size to conform with the physical and individual requirements of the customer.

It has hitherto been customary for a shoe fitter to merely employ the ordinary rule or size stick for the purpose of determining shoe sizes; however, these devices while enabling the length of the foot to be readily determined, yet do not admit of any indication or gage whatever for the purpose of determining the width of the foot. To overcome this disadvantage, other devices have been proposed which have been in the nature of charts, which are formed to provide not only for length measurements but also width measurements and have been used by placing the foot to be fitted upon the chart surfaces and noting the outline of the foot as compared with the measurements provided upon the surface of the chart. These chart devices while permitting of thoroughly accurate length measurements do not give the correct widths. As all width measurements are based solely by shoe manufacturers on the circumference of the ball measurements, it will be apparent that while a slender foot might show the same width on a chart as an obese foot, there may yet be frequently as much in reality as three widths difference between the two, which unless corrected by the fitter will result in the selection of improper sizes. Therefore, the present invention consists in the provision of an improved measuring tape adaptable to accurately note correct data relative to the circumferential measurement of the ball of the foot, and to thus enable the fitter to employ the fundamental standard of size measurements used by all shoe manufacturers.

The present invention consists in the provision of a shoe tape, preferably formed from a flexible material and having one of the terminals thereof provided with length measurements or graduations and the opposite terminal provided with width graduations, the arrangement of the graduations being such that in use the tape is placed around the ball of the foot to be fitted in such manner that the ends of the tape will overlap and the various graduations thereon will be positioned in registering relationship, whereby the clerk may, by noting the relative positions of the length and width measurements or graduations, ascertain correctly and promptly the various shoe sizes which will be best adapted to the foot of the customer.

Another object of the invention resides in forming the tape so that the terminal thereof bearing the length graduations will be materially wider than the terminal bearing the width graduations, this arrangement enabling the terminating ends of the tape to be overlapped and yet to enable a comparison between the various graduations to be readily effected.

With these and other objects in view, as will appear as the description proceeds, the invention accordingly consists in the novel features of construction, combinations of elements and arrangements of parts, hereinafter to be fully described and pointed out in the appended claims.

Figure 2:
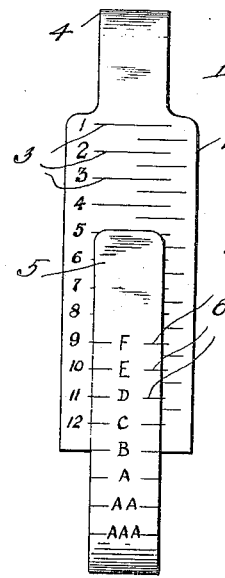

In the accompanying drawing, forming a part of this specification, and in which similar characters of reference denote like and corresponding parts:

Figure 1 is a plan view of the measuring tape comprising the present invention, and, Figure 2 is a view disclosing the graduated ends of the tape in overlapped relationship showing more particularly the position of the tape when employed in effecting measurements.

As is well known by shoe fitters, manufacturers and the shoe trade largely, the actual length of a number one foot is $7\frac{1}{2}$ inches, and that there are three full sizes to every linear inch, and that therefore a number four foot is $8\frac{1}{2}$ inches long and a number seven is $9\frac{1}{2}$ inches long, but it will be readily understood that it is impossible for a person whose foot measures $9\frac{1}{2}$ inches or a number seven to wear a shoe of that size, since the foot would fill the entire space within the shoe and would be too uncomfortable for wearing purposes. Accordingly, shoe merchants usually allow from a size to three sizes longer than the actual length of the foot, the final size selected being usually accomplished by mental calculation after the foot has been actually measured as to its length. When selecting a shoe in this manner, the fitter must also allow for the width in accordance with the final length employed, that is, if a foot measures actually 9½ linear inches, which is a number seven shoe size, the fitter then notes that a shoe must be selected not smaller than a size 8 which leaves only approximately one third of an inch for foot play, the majority of fitters usually allow two sizes longer than the actual length would indicate. In placing an ordinary measuring tape, having linear inches impressed thereon, around the ball of a foot of this size, that is 9½ inches long, the fitter will find it measures somewhere between 7¾ and 9¾ inches, which are the two extreme measurements for width of all standard made shoes of this length. Therefore, in the measuring tape comprising the present invention, the exact distance from the letters *aaa* on the one end, and the figure 8 on the other end should be 7¾ inches or from the indication *aa* to the figure 8 will be eight inches, and so on at one-quarter inch intervals for each width. If the narrower appearing shoe is desired, a longer length carrying the same ball measurements may be selected as the width measurements at the ball are the fundamental measurements instead of the length as is so many times popularly supposed. Thus, a person who wears a No. 8D can also wear a 9C, as the ball measurements of the two shoes are the same.

Referring more particularly to the details of the invention, I employ a measuring tape, designated generally by the numeral 1, which is preferably formed from fabric or any other equivalent flexible material which is capable of permanently maintaining its standard form or size. In this instance the tape includes a relatively broad or enlarged terminating end 2 which has one or both of its surfaces provided with a series of graduations 3, which are so spaced and numbered as to indicate various shoe lengths, and in this instance the measurements indicate sizes varying in length from 1 to 12, inclusive, together with intervening and accompanying half sizes. It will be observed that the graduations 3 consist of a plurality of parallel equidistantly spaced lines which extend across the width of the end 2, the said lines being suitably and individually designated by the numbers indicating the various sizes, the said numbers being situated adjacent to one of the longitudinal edges of the tape and in this instance the lines representing the half sizes are situated so as to extend toward the other longitudinal edge of the tape. The end 2 terminates in a relatively narrow body portion 4, which in turn is extended to produce an end 5 substantially the same width as the body portion. This end 5 has one or both of its surfaces provided with spaced transversely extending marks suitably lettered to indicate the various shoe widths, or in other words, all widths varying between AAA and the width F.

By this construction shoe measurements may be quickly ascertained by placing the tape so that the same will circumferentially surround the ball of the foot of the shoe purchaser. The end 2 is positioned and held stationary upon the upper part of the foot, while the end 5 is grasped and pressure is thereby applied to the tape so that the latter will be drawn tautly about the foot of the purchaser. This operation brings the end 5 into overlapping relationship with the end 2 and thus enables the graduations 3 and the width graduations 6 to be relatively compared. It will be observed that this feature can be readily accomplished by reason of the fact that the end 2 is materially wider than the end 5, and therefore the said ends may overlap each other without in any way retarding or obscuring the readings to be taken from the graduations. By reference to Figure 2 it will be noted that the lines indicating the width measurements 6 are spaced relatively the same distance apart as the transversely extending lines indicating the length measurements. Therefore, when the tape has been drawn tautly the various sizes of shoes capable of being worn by the purchaser may be readily ascertained by the clerk and a properly fitting size thereby selected in accordance with the character of the shoe desired by the customer. It will be understood that the tape may be suitably reinforced or may be formed from any desired materials. The operation thereof is very simple, the foot is accurately measured, at the same time the clerk when noting the fundamental measurement may yet observe such secondary sizes as are capable of being worn by the purchaser in accordance with the type of shoe selected. The device also has the advantage of being capable of being readily carried by the clerk and may be used whenever occasion may demand without waiting.

What is claimed is:

1. A measuring tape of the character described formed to comprise opposed terminal portions, one of said portions being provided with graduations indicating shoe widths corresponding to foot width measurements, and the other portion being provided with graduations indicating shoe sizes corresponding to foot length measurements, said terminal portions being capable of being overlapped so that the graduations thereof may be placed in contiguous relationship for comparison.

2. A measuring tape of the character described comprising a flexible body including opposed terminals, one of said terminals being provided with graduations indicating shoe widths corresponding to foot width measurements and the other of said terminals being provided with graduations indicating shoe sizes corresponding to foot length measurements, the said terminals being of relatively different width, whereby the same may be placed in overlapping relationship without operatively obscuring the graduations thereof.

3. A measuring tape of the character described, comprising a flexible body portion formed to include opposed terminals, one of said terminals being of relatively greater width than the opposite terminal, the said wider terminal being formed with graduations spaced to indicate shoe sizes corresponding to foot length measurements, and the said narrower terminal being provided with graduations indicating shoe widths corresponding to foot width measurements, the said terminals being capable of being drawn to assume an overlapped relation and when in such relation to permit the graduations thereof to be relatively compared.

In testimony whereof I affix my signature.

GEORGE CLAUSING.